W. H. HOYT.
Water and Steam Cock.

No. 213,903. Patented April 1, 1879.

Witnesses,
W. P. Coleman
Bradley Hoyt

Inventor,
William H. Hoyt,
per Attorney
Addison J. Waterhouse.

UNITED STATES PATENT OFFICE.

WILLIAM H. HOYT, OF SACRAMENTO, CALIFORNIA.

IMPROVEMENT IN WATER AND STEAM COCKS.

Specification forming part of Letters Patent No. 213,903, dated April 1, 1879; application filed April 8, 1878.

*To all whom it may concern:*

Be it known that I, WILLIAM H. HOYT, of the city and county of Sacramento, State of California, have invented a new and useful Improvement in Water and Steam Cocks, of which the following is a specification:

The invention relates to that class of cocks or bibs used for water or steam pipes, having a valve-seat capable of being readily replaced or repacked, and free from any destructive wear or leakage.

Figure 1:
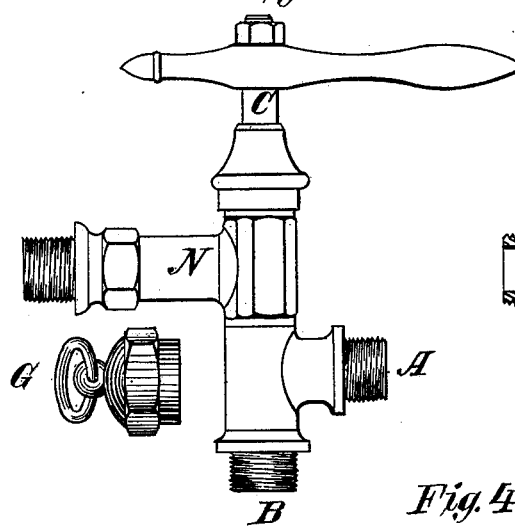
Figure 2:
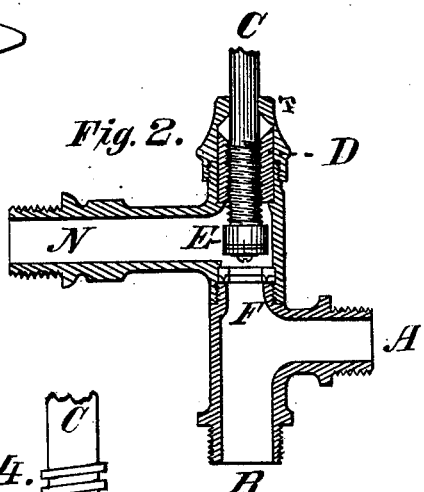
Figure 3:
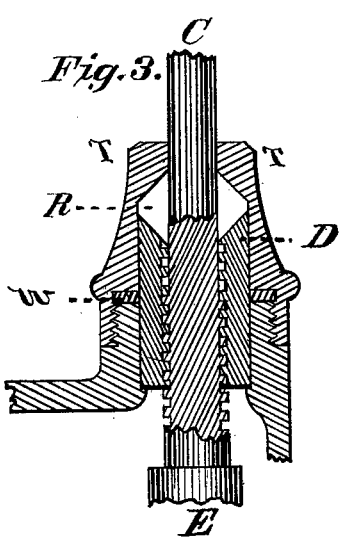
Figure 4:
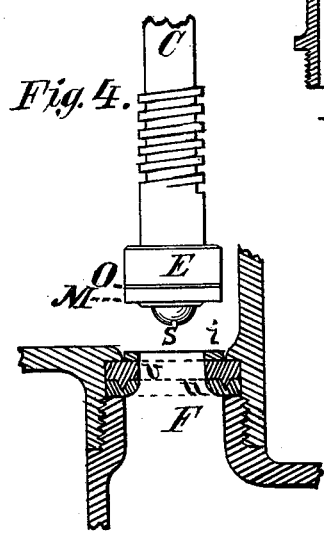

Referring to the accompanying drawings, Figure 1 is an elevation of a water-cock embodying my invention. Fig. 2 is a sectional elevation of Fig. 1. Fig. 3 is a detail of screw-valve shank. Fig. 4 is a detail of valve and valve-seat.

Fig. 1 shows an elevation of a hydrant-cock made on the plan embodied in my invention, possessing two nozzles or outlets, A and B, and provided with the accompanying cap G, to be used for the purpose of screwing on and closing either nozzles A or B when only one is required to be opened. The object of having two nozzles on the cock are, that a hose or pipe can be attached to either for running in different directions, or when a hose is attached, say to A, the cap G can be removed from B, for the purpose of drawing water therefrom when required without being forced to the necessity of removing the hose and causing the slop and difficulty attending such an operation on account of the backwater in the hose, and the difficulty of resecuring a tight fit to the same. In case a common bib only is required with a single nozzle, I dispense with A and the cap G, and only have B formed in suitable shape with or without thread, as required, and in all cases having the bore of B perpendicular and smooth, so that when the fluid is passing through it the stream is solid and does not scatter around, as is commonly the case. N is the shank attached to the pipe. C is the valve-shank.

Fig. 2 shows a sectional view of the same, showing the shank N, the nozzles A and B, valve-shank C, valve E, and threaded bushing D, used for the purpose of causing the longitudinal motion to the shank C and valve E, and also to assist in forming a gland for packing C. F is the valve-seat.

Fig. 3 is a detail, showing the upper part of the cock, the valve-shank C, and the threaded bushing D, said bushing being formed so as to be inserted into the cock and held in its place by the cap T, each being so formed as to leave a recess, R, wherein packing is inserted in order to prevent leakage through the hole that C enters. The packing-washer W is to prevent the leaking between the cap T and the cock.

I do not confine myself to the particular mode of packing the joint made by the cock and cap T, for the reason that cap T and the bushing D may be so formed as to present several different surfaces for packing which are equivalent to the method presented in their effect.

One advantage I claim for the inserted bushing D is, that it relieves the cock from all wear, and when the thread is worn out another bushing and shank can be inserted in its place, making the cock as good as new again.

Fig. 4 shows a sectional detail, showing that part of the cock to which the nozzle end is secured, the valve-seat F, the valve E, and shank C. The valve-seat F is held in its place by being made to form the packing part of the joint when the nozzle end B and the cock proper are screwed together, the cock proper being rabbeted, and the nozzle B being suitably extended on their inner face, for the purpose of admitting and securing the outer circumference of the metallic valve-seat V and the packing-washer W, and consists of three parts—viz., the leather or elastic washer N, used as packing, the metallic valve-seat V, provided with V-ring or suitable bead to keep N in the joint, and the leather or elastic washer I, used for the purpose of packing the joint formed by the valve-seat V and the valve E when forced down for the purpose of closing the cock. This washer I, being fitted neatly to the inner perpendicular walls of the shank N, and resting upon the metallic valve-seat V, is held in its place securely by the pressure of the valve E when the valve is closed, and by the pressure of the water when it is open. The valve E is worked by the screw-shank C, and is composed of the valve-head E, the metallic washer M, and the leather or elastic washer O, and the screw, the purpose of S being to secure O and M to the valve-head E, and still allow them to turn freely around on the shank of the screw; the purpose of M being to form the face of the valve, which shuts down on the valve-seat and washer I, thus closing the opening F. The reason of having the face M a separate piece from E is, that it will be free to rotate around the screw S, so that when the valve E is being screwed down on the seat F the face M stops turning as soon as it comes in contact with the washer I, allowing the valve E and screw S to turn until it produces a pressure on the washer I that prevents the possibility of a leak through the valve and seat, thus avoiding any abrasion of surfaces or wear to occur between the valve-face M and seat V and I. O is a leather or elastic washer, used for the purpose of preventing leak between the valve E and face M, and also to act as a washer, upon which the face M can easily turn without wear or any considerable degree of friction.

The object of the above described valve and valve-seat is to secure durability to the cock by having all the parts where any wear or leak may occur made renewable, and to secure durability by having washers of suitable material interposed wherever contact of metal may occur; and, also, whenever the cock becomes leaky, the defective parts can be readily replaced by good ones, and the cock made thereby as good as new.

What I claim as new, and desire to secure by Letters Patent, is—

1. The combination of the adjustable valve-seat V, provided on its under surface with an annular V-shaped projection, fitting into a groove in the packing-washer N, with the packing-washer N and the elastic washer I, as, or substantially as, shown and described.

2. The combination of the adjustable valve-seat V, provided with annular V-shaped bead, and the washer N, held in its place by the bead of the valve V pressing in N when both are screwed tightly together, by the nozzle-piece B being screwed in the cock T, and pressing the valve V and washer N between B and T, substantially as and for the purposes set forth.

WILLIAM H. HOYT.

Witnesses:
W. P. COLEMAN,
BRADLEY HOYT.